United States Patent
Richter et al.

(10) Patent No.: US 11,435,000 B2
(45) Date of Patent: Sep. 6, 2022

(54) SLIP RING SEAL ARRANGEMENT WITH SPLIT SHAFT SLEEVE

(71) Applicant: EagleBurgmann Germany GmbH & Co. KG, Wolfratshausen (DE)

(72) Inventors: Stefan Richter, Wolfratshausen (DE); Alfred Matuschek, Ascholding (DE); Hans Steigenberger, Eurasburg (DE)

(73) Assignee: EagleBurgmann Germany GmbH & Co. KG, Wolfratshausen (DE)

( * ) Notice: Subject to any disclaimer, the term of this patent is extended or adjusted under 35 U.S.C. 154(b) by 64 days.

(21) Appl. No.: 16/970,869

(22) PCT Filed: Jan. 22, 2019

(86) PCT No.: PCT/EP2019/051436
§ 371 (c)(1),
(2) Date: Aug. 18, 2020

(87) PCT Pub. No.: WO2019/162015
PCT Pub. Date: Aug. 29, 2019

(65) Prior Publication Data
US 2020/0378502 A1    Dec. 3, 2020

(30) Foreign Application Priority Data
Feb. 22, 2018 (DE) .......................... 102018202681.5

(51) Int. Cl.
*F16J 15/38* (2006.01)
*F16J 15/34* (2006.01)

(52) U.S. Cl.
CPC ........... *F16J 15/3464* (2013.01); *F16J 15/38* (2013.01)

(58) Field of Classification Search
CPC ...... F16J 15/34; F16J 15/3464; F16J 15/3472; F16J 15/38
See application file for complete search history.

(56) References Cited

U.S. PATENT DOCUMENTS

| 2,818,285 A * | 12/1957 | Greiner .................. F16J 15/38 |
| | | 277/371 |
| 4,434,986 A * | 3/1984 | Warner ................ F16J 15/3464 |
| | | 277/369 |
| 2018/0363781 A1 * | 12/2018 | Pehl ..................... F16J 15/3468 |

FOREIGN PATENT DOCUMENTS

| CN | 202768858 U | 3/2013 |
| DE | 4418650 A1 | 11/1995 |

(Continued)

OTHER PUBLICATIONS

International Search Report issued in PCT Patent Application No. PCT/EP2019/051436, dated Apr. 4, 2019.

(Continued)

*Primary Examiner* — Gilbert Y Lee
(74) *Attorney, Agent, or Firm* — Locke Lord LLP; Scott D. Wofsy

(57) ABSTRACT

The invention relates to a mechanical seal arrangement comprising a mechanical seal including a rotating slide ring (2) and a stationary slide ring (3) which define a sealing gap (4) between seal faces (21, 31), a shaft sleeve arrangement (5), comprising a split shaft sleeve with a first annular sleeve part (51) and a second annular sleeve part (52), which are connected to each other by means of a snap-in connection (6), wherein the rotating slide ring (2) is arranged on the shaft sleeve arrangement (5), and wherein the snap-in connection (6) comprises at least one snap-in nose (60) and one snap-in recess (61) receiving the snap-in nose (60) to allow the first sleeve part (51) to engage with the second sleeve part (52).

10 Claims, 6 Drawing Sheets

(56) References Cited

FOREIGN PATENT DOCUMENTS

Figure 1:
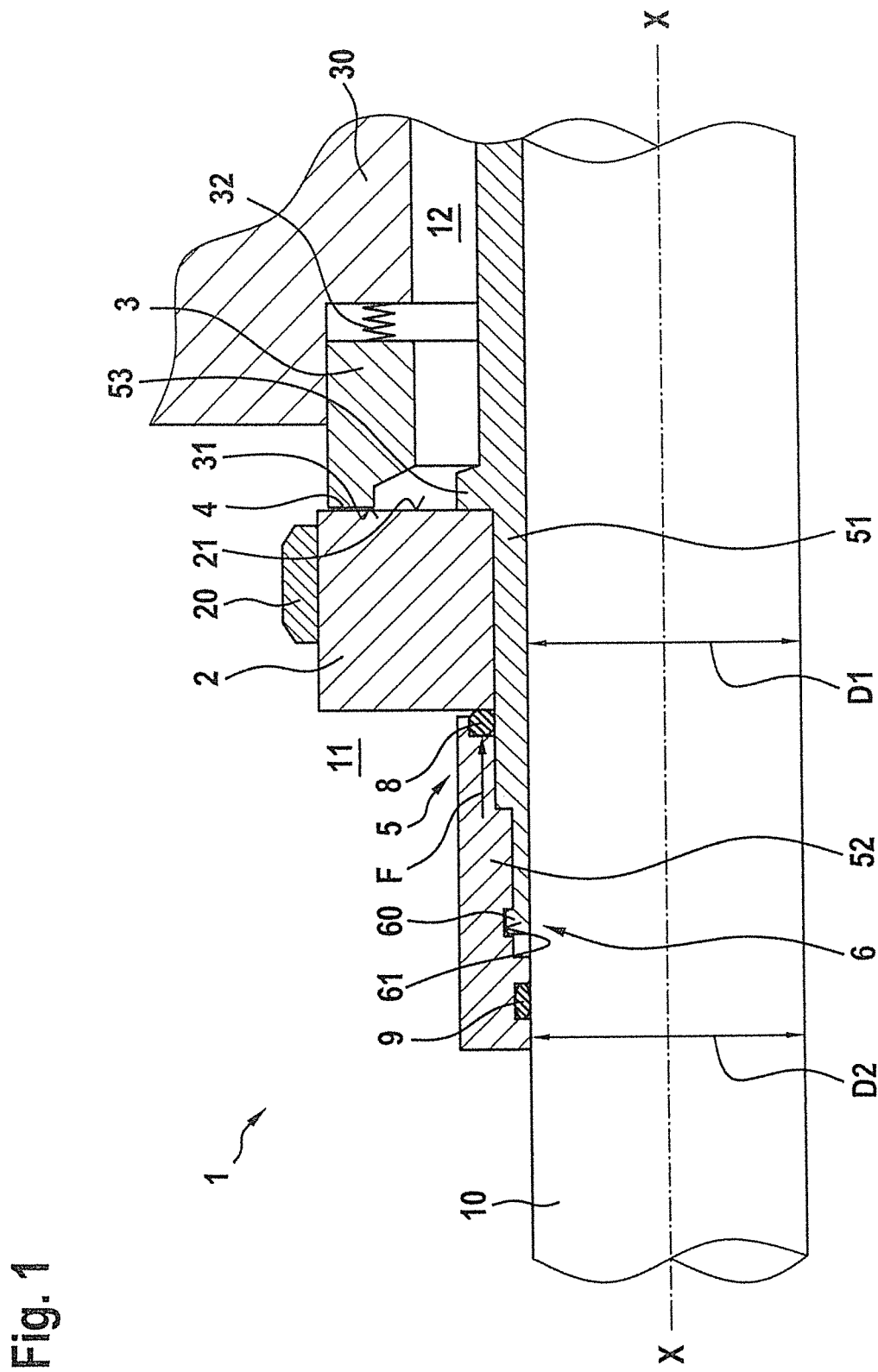

| | | |
|---|---|---|
| DE | 20312908 U1 | 10/2003 |
| DE | 102017205394 A1 | 10/2018 |
| WO | 2016202475 A1 | 12/2016 |

OTHER PUBLICATIONS

Chinese Office Action dated Dec. 27, 2021, issued during the prosecution of Chinese Patent Application No. CN 201980013932.0.

India Office Action dated Feb. 15, 2022, issued during the prosecution of U.S. Patent Application No. 202017034608.

\* cited by examiner

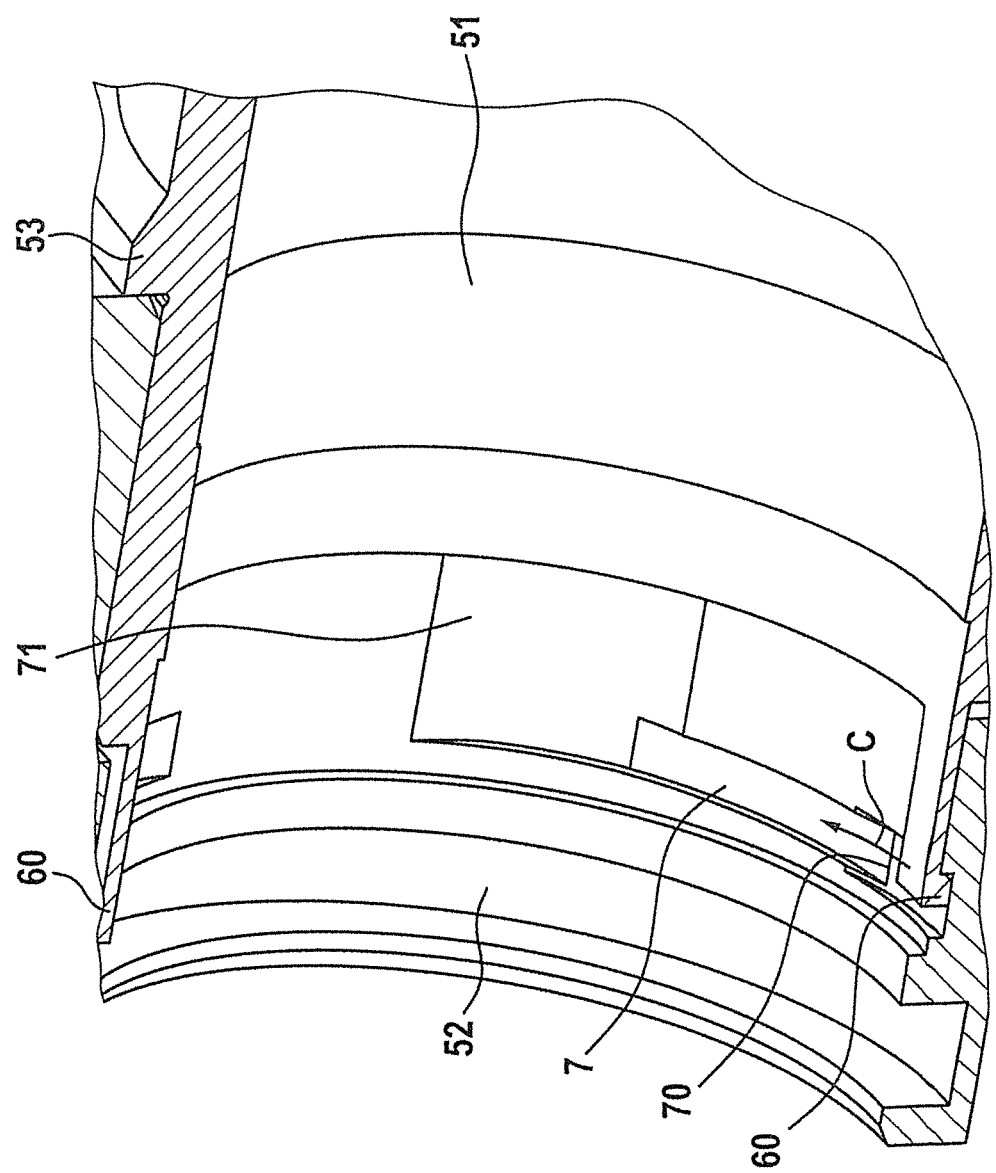

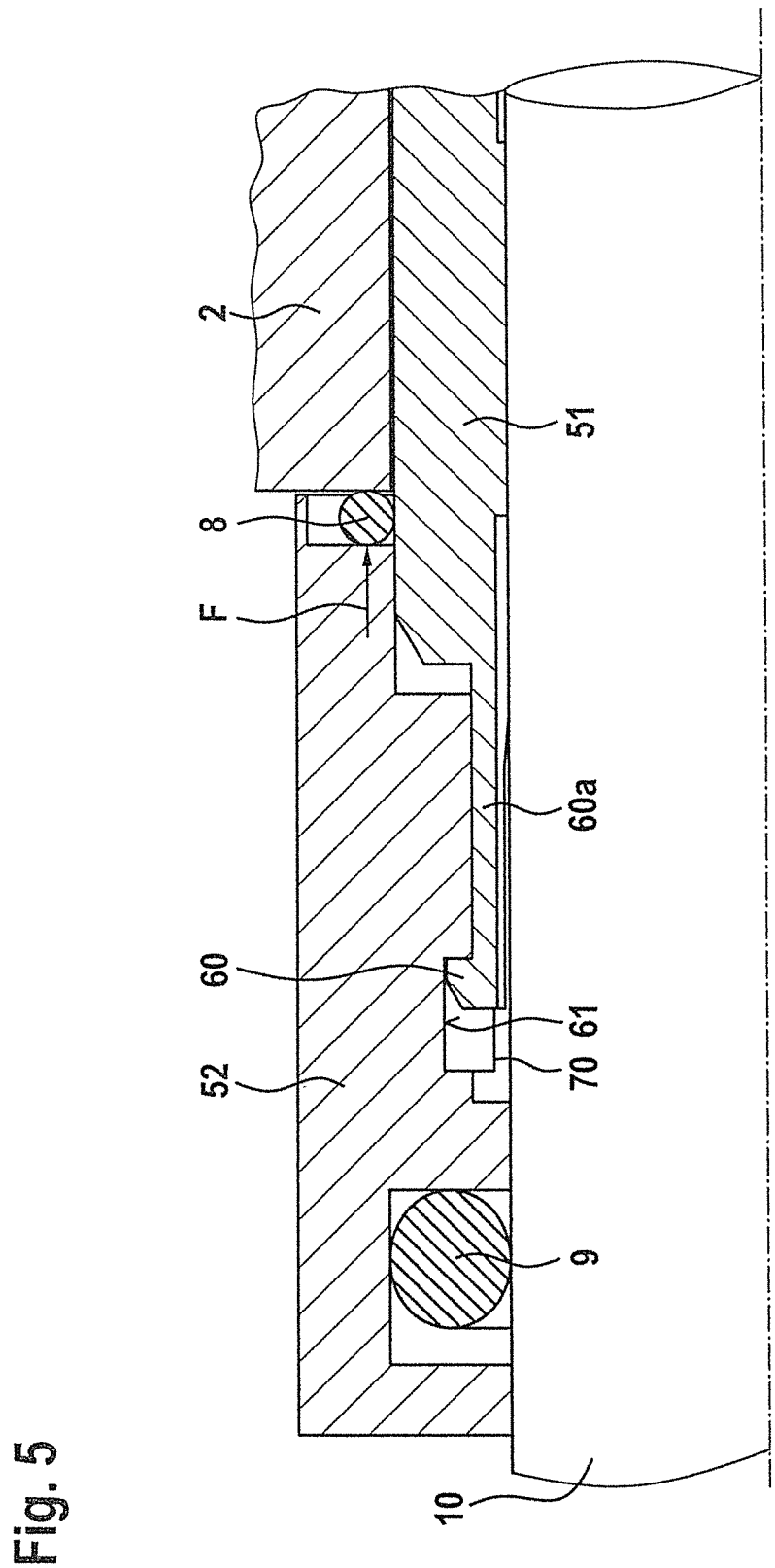

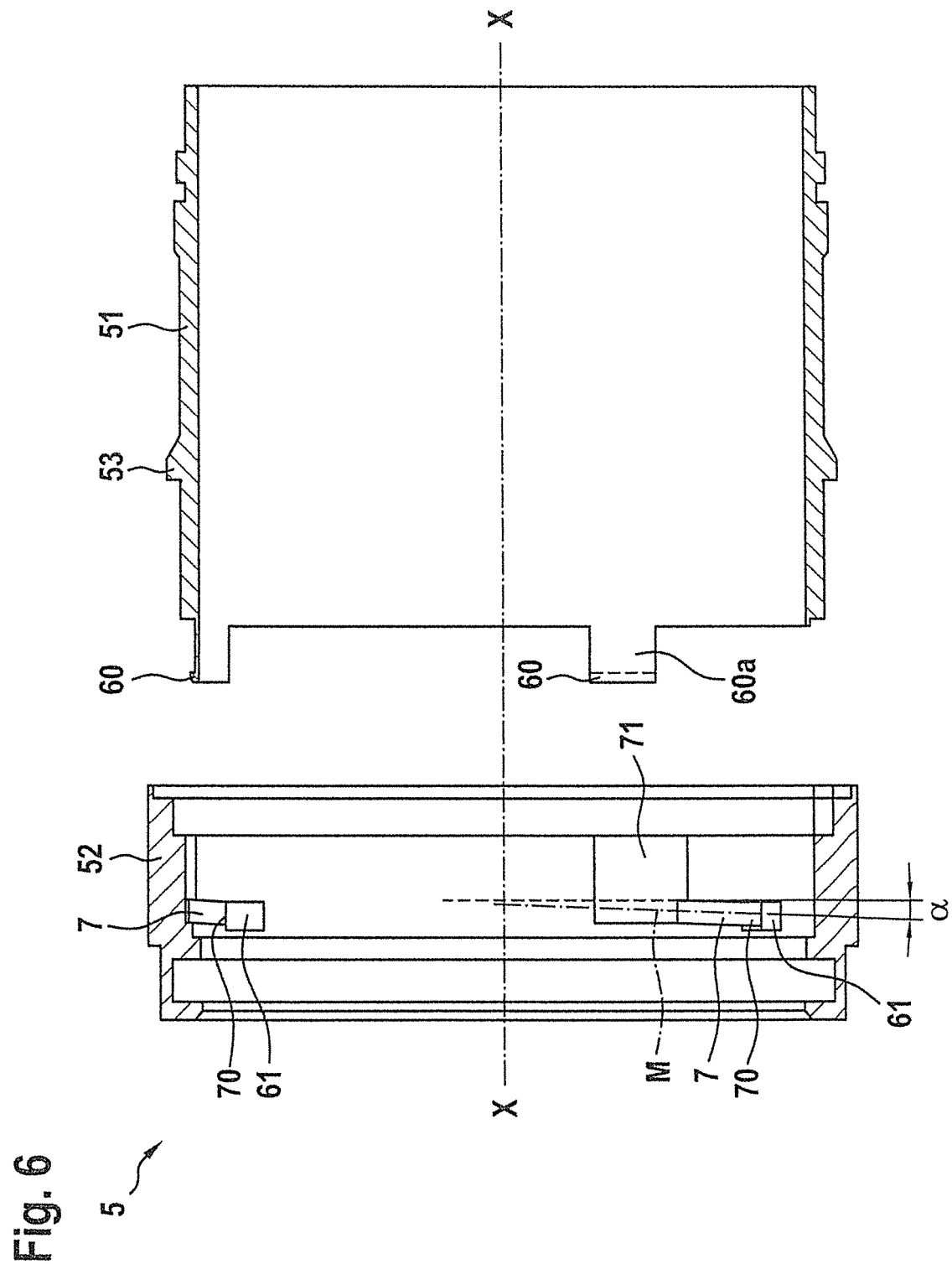

SLIP RING SEAL ARRANGEMENT WITH SPLIT SHAFT SLEEVE

CROSS-REFERENCE TO RELATED APPLICATIONS

This application is a U.S. National Phase Application filed under 35 U.S.C. § 371, based on International Patent Application No. PCT/EP2019/051436, filed Jan. 22, 2019, which claims priority to German Patent Application No. 102018202681.5, filed on Feb. 22, 2018. The entire contents of these applications is incorporated herein by reference.

The present invention relates to a mechanical seal arrangement with split shaft sleeve, which is divided into two annular sleeve parts, and being able to clamp a mechanical slide ring in the axial direction between the sleeve parts.

Mechanical seal arrangements are known in various configurations from prior art. For example, such mechanical seal arrangements are used in centrifugal pumps to seal on a shaft of the centrifugal pump. In this case, it is known to arrange the mechanical seal on a one-piece shaft sleeve, so that the mechanical seal arrangement is available to a customer as a pre-assembled arrangement and only needs to be fixed on a shaft. In particular, this has mounting advantages. However, the disadvantage of such mechanical seals is that the one-piece shaft sleeve comes into contact with the product to be sealed, so that, depending on the product, a very high-quality and expensive material is required to be used for the entire shaft sleeve. This makes the shaft sleeve a very long, tube-like component that may cause problems during mounting.

Therefore, it is the object of the present invention to provide a mechanical seal arrangement which in particular allows improved handling during assembling and disassembling on a shaft, while being of simple design and easy and inexpensive to manufacture.

This object will be solved by a mechanical seal arrangement having the features of claim 1. The subclaims show preferred embodiments of the invention.

The mechanical seal arrangement according to the invention having the features of claim 1 has the advantage that assembling and disassembling is significantly simplified. Furthermore, a shaft sleeve of the mechanical seal arrangement can be manufactured in a much more economical manner. The mechanical seal arrangement comprises a mechanical seal including a rotating slide ring and a stationary slide ring, which define a seal gap between their seal faces. Furthermore, the mechanical seal arrangement comprises a shaft sleeve arrangement with a split shaft sleeve. The shaft sleeve is axially divided into a first annular sleeve part and a second annular sleeve part in the plane perpendicular to the axial direction. The two sleeve parts are then joined together by means of a snap-in connection. The rotating slide ring is arranged on the shaft sleeve arrangement, and the snap-in connection comprises at least one snap-in nose and one snap-in recess for receiving the snap-in nose to allow the two sleeve parts to engage into each other. The snap-in connection can be engaged in a quick and easy manner and similarly, can as well be released in a quick and easy manner. Thus, for example, when replacing the slide rings, it is also possible that a part of the two-part shaft sleeve arrangement remains on the shaft to be sealed and only releasing the snap-in connection to remove one of the sleeve parts so that the slide rings can be replaced. Thus, connection of the two sleeve parts may be realized without additional components such as screws or the like.

Preferably, the snap-in connection is a plug-and-turn connection. In this case, the snap-in connection is provided such that the two sleeve parts first perform a plug-in movement in the axial direction of the shaft sleeve arrangement, followed by a relative rotation between the first and second sleeve parts until the snap-in nose of the snap-in connection is received in a snap-in recess. The shaft sleeve arrangement will then be engaged. To release the snap-in connection, the two sleeve parts are required to first be rotated in opposite directions to release engagement, and then the first sleeve part is to be axially removed from the second sleeve part.

Preferably, the snap-in connection comprises a threaded arrangement including a thread flight, wherein the snap-in recess is located on the thread flight. To reach the snap-in recess, the snap-in nose must first be guided across the thread flight. As the thread flight has a thread inclination at an acute angle in relation to a radial plane to the center axis of the shaft sleeve arrangement, it will result in the first and second sleeve parts approaching each other when rotating the two sleeve parts relative to each other, as the two sleeve parts are moved towards each other in the axial direction when rotating the snap-in nose in the thread flight.

A dam is preferably arranged between the thread flight and the snap-in recess. The dam is an elevated area starting from the bottom of the thread flight and preferably comprises a run-up ramp and a run-down ramp. This allows the snap-in nose to easily overcome the dam when turning. At the same time, the ramps also allow the two sleeve parts to easily be released.

Preferably, the snap-in recess of the snap-in connection is located at the end of the thread flight. Thus, the snap-in recess closes the thread flight.

Further preferably, an access recess is provided on the thread flight for guiding the snap-in nose towards the thread flight. Thus, insertion of the snap-in nose into the other part of the sleeve occurs in the area of the access recess until the snap-in nose will be positioned on the thread flight. It is only then that turning the two sleeve parts against each other will occur.

It is especially preferred for the first sleeve part to comprise a stop on an outer circumference, against which the rotating slide ring rests, and an elastomer seal is arranged on the second sleeve part, which rests against the rotating slide ring of a surface, the rotating slide ring being arranged between the stop and the elastomer seal.

In this context, it is especially preferred for the snap-in connection, in the engaged state, to exert a force F in the axial direction onto the elastomer seal to clamp the rotating slide ring between the elastomer seal and the stop on the first sleeve part. Thus, clamping the rotating slide ring onto the shaft sleeve arrangement may simultaneously be enabled when engaging the first and second sleeve parts. Other components for holding the slide ring, in particular slide ring carriers or the like, are no longer required. In this way, a particularly simple and cost-effective mechanical seal arrangement may be provided. As the slide ring is in contact with the soft elastomer seal at the back of the slide ring when it is clamped, damage to the slide ring may be avoided.

Preferably, the elastomer seal is an O-ring.

Preferably, the stop is integrally formed with the first sleeve part and annularly extends around the circumference of the seal to achieve even distribution of force at the stop when clamping the rotating slide ring.

Preferably, the first and second sleeve parts are made of different materials. Herein, the sleeve part which comes into contact with the product to be sealed, in case it is an aggressive product or a toxic product or the like, is made of higher quality and usually more expensive material. The other part of the sleeve, which does not come into contact with the product, may be made of a lower cost material. This also allows the manufacturing costs to be significantly reduced compared to the previously used one-piece shaft sleeves.

Further preferably, the snap-in connection comprises at least two snap-in noses and two snap-in recesses. In particular, the snap-in connection comprises exactly three snap-in noses and exactly three snap-in recesses.

It is particularly preferred for the snap-in noses and the snap-in recesses to be arranged at equal distances from each other along the circumference.

Preferably, an inner diameter of the first sleeve part is equal to an inner diameter of the second sleeve part.

Furthermore, the present invention relates to a pump, in particular a centrifugal pump comprising a mechanical seal arrangement according to the invention, wherein the mechanical seal arrangement seals a liquid medium to be conveyed using the pump against a rotation shaft of the pump.

Figure 2:
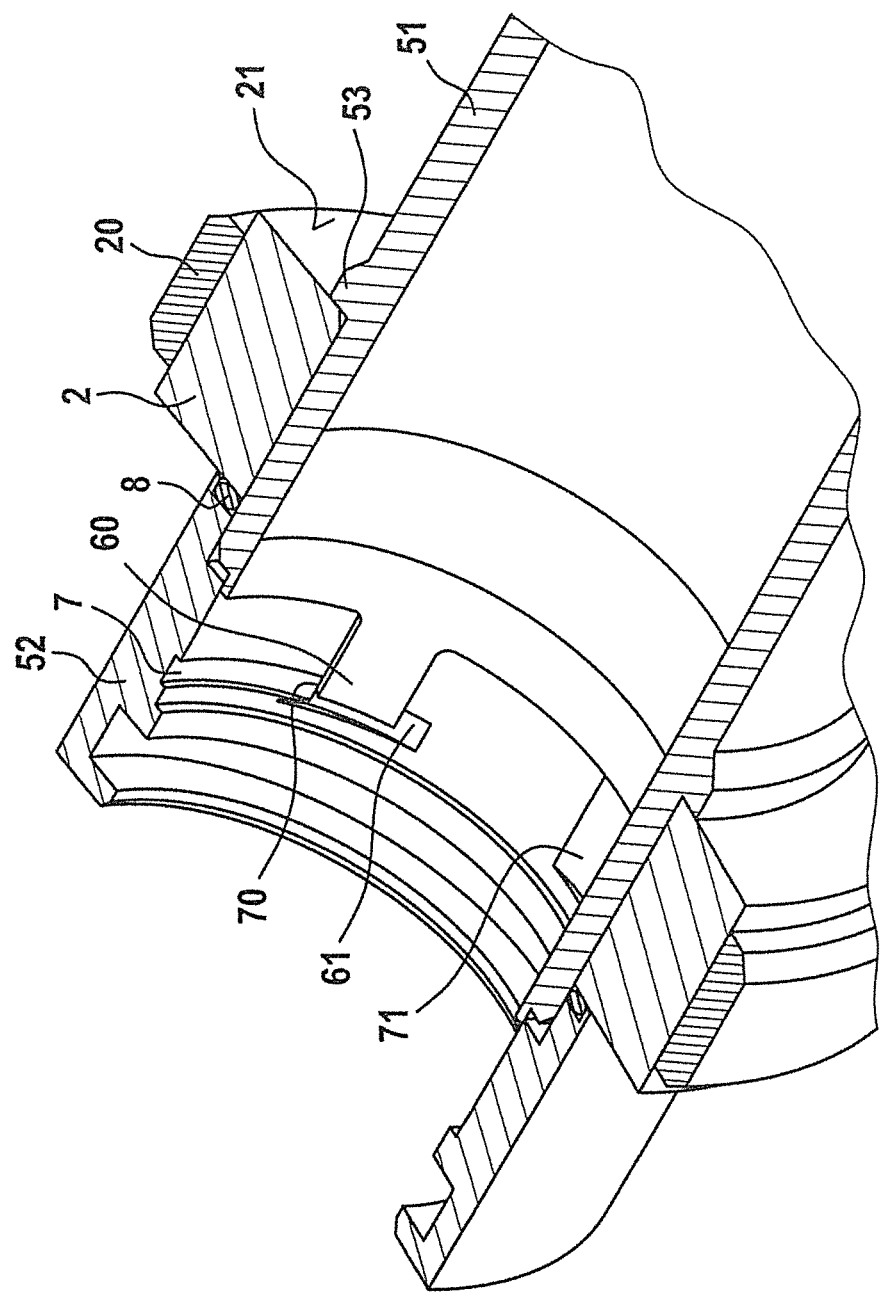
Figure 3:
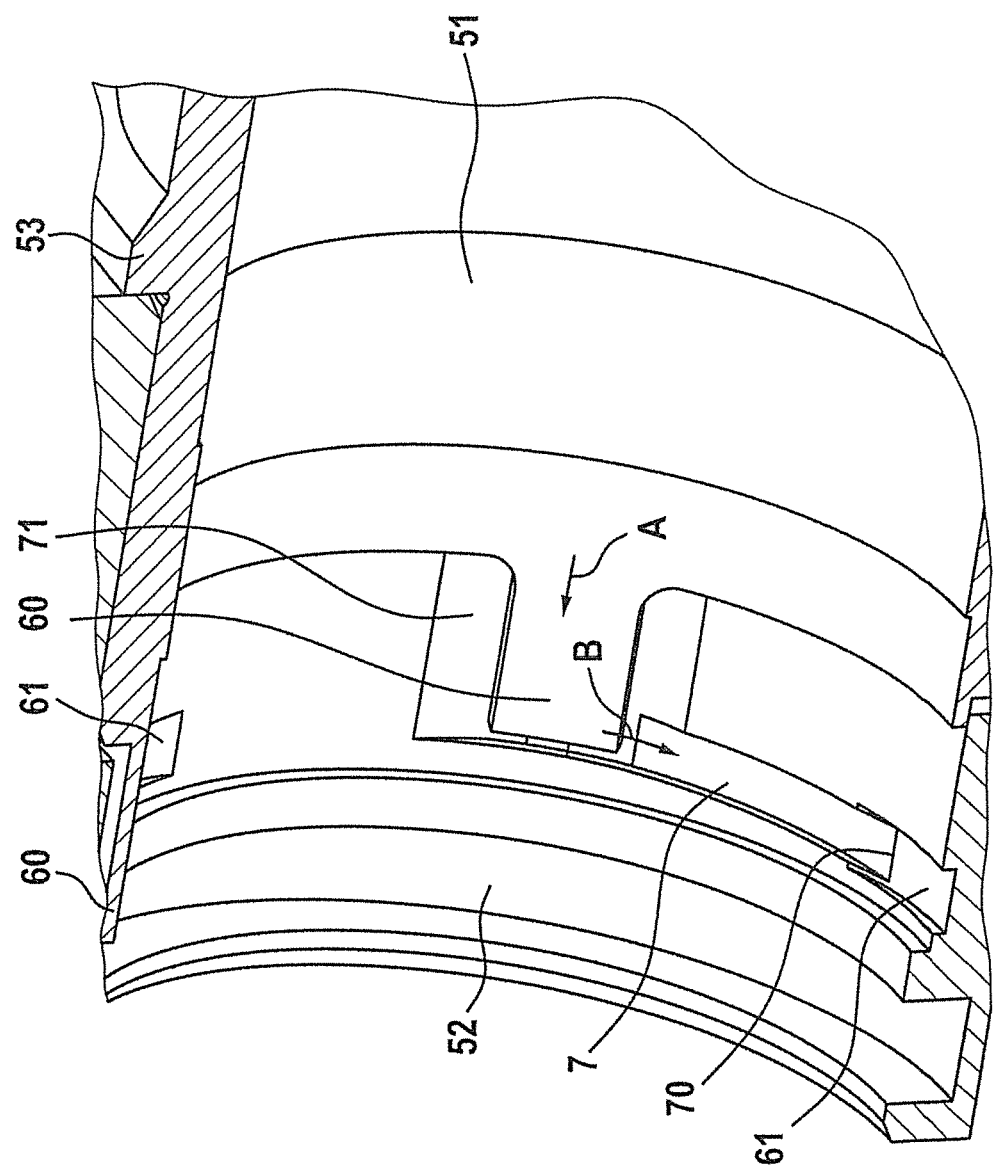

In the following, a preferred embodiment of the invention will be described while reference will be made to the accompanying drawings, wherein:

FIG. 1 is a schematic sectional view of a mechanical seal arrangement according to a preferred embodiment of the invention, FIG. 2 is a schematic perspective sectional view of a shaft sleeve arrangement of the mechanical seal arrangement of FIG. 1, FIG. 3 is another schematic perspective sectional view of the shaft sleeve arrangement as seen from a different angle in the unsnapped state, FIG. 4 is a schematic perspective sectional view of the shaft sleeve arrangement of FIG. 3 in the snapped-in state, FIG. 5 is a schematic partial sectional view of the shaft sleeve arrangement of FIG. 2, and FIG. 6 is a schematic sectional view of a first and second sleeve part of the shaft sleeve arrangement of the invention in the disassembled state.

In the following, a mechanical seal arrangement 1 according to a first embodiment of the invention will be described in detail while making reference to the FIGS. 1 to 6.

The mechanical seal arrangement 1 seals on a shaft 10, which is part of a pump not shown.

The mechanical seal arrangement 1 comprises a mechanical seal including a rotating slide ring 2 and a stationary slide ring 3, which defines a seal gap 4 between a slide face 21 of the rotating slide ring 2 and a seal face 31 of the stationary slide ring 3.

The mechanical seal arrangement 1 further comprises a shaft sleeve arrangement 5, which is shown in detail in FIG. 6. The shaft sleeve arrangement 5 comprises a first sleeve part 51 and a second sleeve part 52. In FIG. 6, the two sleeve parts 51, 52 are shown in an unconnected state to illustrate the arrangement. An inner diameter D1, D2 of the two sleeve parts 51, 52 is the same and constant without any step.

The two sleeve parts 51, 52 of the shaft sleeve arrangement 5 may be connected to each other by means of a snap-in connection 6. The connected state of the two sleeve parts 51, 52 is shown in FIG. 5. The snap-in device 6 comprises three snap-in noses 60 and three snap-in recesses 61. The snap-in noses 60 are arranged on the first sleeve part 51 and the snap-in recesses 61 are arranged on the second sleeve part 52.

As may be seen from FIG. 6, three snap-in noses 60 are provided along the circumference at equal circumferential intervals on the first sleeve part 51 and correspondingly three snap-in recesses 61 are also provided on the second sleeve part 52.

As may be seen from FIGS. 2 and 3, the snap-in connection 6 also comprises a thread flight 7 and an access recess 71. The thread flight 7 has a center line M, which is arranged at an angle α in relation to a vertical line to a center line X-X of the shaft sleeve arrangement 5 (see FIG. 6). The angle α determines the flight of thread flight 7 and, in this embodiment, is appx. 3°. As a result of the thread flight 7, an axial movement of the two sleeve parts 51, 52 towards each other is achieved when engaging the first and second sleeve part 51, 52 into each other.

In order to engage the two sleeve parts 51, 52 into each other, a plug-and-turn-connection is realized as indicated by arrows A and B in FIG. 3. For this purpose, the snap-in noses 60 are axially inserted into the access recesses 71 on the second sleeve part 52 in the direction of arrow A. Then, the two sleeve parts 51, 52 are turned in relation to each other so that the snap-in noses 60, as indicated by arrow B in FIG. 3, are moved in the thread flights 7 towards the snap-in recesses 61. As may be seen in particular from FIG. 6, the snap-in recesses 61 are located at the end of each thread flight 7.

As may furthermore be seen from FIGS. 3 and 5, a dam 70 is provided between the snap-in recess 61 and the thread flight 7. When moving the snap-in nose 60 in the direction of arrow B, the snap-in nose 60 therefore is required to overcome the dam 70 to reach the snap-in recess 61. On both sides of the dam 70 ramps are provided to enable simple snap-in with the least possible effort. When crossing the dam 70, elastic deformation of a connecting member 60a of the snap-in nose 60 occurs, attaching the snap-in nose 60 to the first sleeve part 51. The dam 70 thus secures the first sleeve part 51 to the second sleeve part 52.

As may be seen in particular from FIGS. 2, 3 and 6, a stop 53 for the rotating slide ring 2 is also provided on the outer circumference of the first sleeve part 51. As shown in FIG. 2, the rotating slide ring 2 rests on the stop 53 of the first sleeve part 51. Furthermore, on the second sleeve part 52, an elastomer seal 8 (first seal) is provided on an end face of the second sleeve part 52, which faces the first sleeve part 51. As may be seen from FIGS. 2 and 5, the elastomer seal 8 abuts the rotating slide ring 2 on the side opposite the seal face 21. As relative movement of the first and second sleeve part 51, 52 in the direction towards each other takes place in the snapped-in state, a biasing force F may be exerted on the elastomer seal 8 through the arrangement of the elastomer seal 8, thus clamping the rotating seal face 2 between the stop 53 and the elastomer seal 8 on the second sleeve part 52. This enables the rotating slide ring 2 to be securely fixed to the shaft sleeve arrangement 5 without the need for further components. The soft elastomer seal 8 prevents damage caused by clamping. This avoids any contact between the rotating slide ring 2 and the second sleeve part 52 and a gap is always maintained during operation. In particular, there is no need to provide a screw connection or the like, so that the rotating slide ring 2 may be provided free of recesses or weakenings or the like. This will further improve the service life of the rotating slide ring.

The elastomer seal 8 is preferably provided as an O-ring.

In order to achieve a secure seal on the shaft 10, a second seal 9 is also provided on the second sleeve part 52 on the side facing the shaft. Preferably, the second seal 9 is also an O-ring.

As may be seen in particular from FIG. 1, the mechanical seal arrangement 1 can thus seal a product side 11 from an atmospheric pressure side 12. As shown in FIG. 1, the first sleeve part 51 does not come into contact with the product, only the second sleeve part 52 comes into contact with the product. This makes it possible that the two sleeve parts 51, 52 can be made of different materials. Especially in the case of an aggressive product, it is no longer necessary to manufacture the entire shaft sleeve from a high-quality and expensive material. Instead, according to the invention, it is possible that only the second sleeve part 52 is manufactured from a high-quality material and the first sleeve part 51 may be manufactured from a less expensive material according to its requirements.

As may further be seen from FIG. 1, a bandage 20 is provided on the outer circumference of the rotating slide ring 2. Furthermore, a biasing device 32 in the form of a spring member is provided on the stationary slide ring 3.

The reference number 30 indicates a housing on which the stationary slide ring 3 is arranged.

Thus, as may be seen from FIGS. 3 and 4, the snap-in connection 6 can be locked by a plug-and-turn connection by inserting the snap-in noses 60 of the first sleeve part 51 into the 15 access recesses 71 in the axial direction and then turning the first sleeve part 51 in relation to the second sleeve part 52 (arrow B) until the snap-in noses 60 engage into the snap-in recesses 61. To release the catch mechanism, first the two sleeve parts 51, 52 (arrow C in FIG. 4) are turned, followed by pulling them axially apart.

LIST OF REFERENCE NUMBERS

1 Mechanical seal arrangement
2 Rotating slide ring
3 Stationary slide ring
4 Sealing gap
5 Shaft sleeve arrangement
5 Snap-in connection
7 Thread flight
8 First seal/elastomer seal
9 Second seal
10 Shaft
11 Product side
12 Atmospheric pressure side
20 Bandage
21 Slide face of the rotating slide ring
30 Housing
31 Slide face of the stationary slide ring
32 Biasing device
51 First sleeve part
52 Second sleeve part
53 Stop
60 Snap-in nose
60a Connecting member
61 Snap-in recess
70 Dam
71 Access recess
A Plug-in direction
B Direction of rotation
C Back-turn
D1 Inner diameter of the first sleeve part
D2 Inner diameter of the second sleeve part
F Clamping force generated by snap-in connection
M Center line
X-X Center axis of the shaft sleeve arrangement
α Angle of the thread flight

The invention claimed is:

1. A mechanical seal arrangement comprising:
   a mechanical seal including a rotating slide ring and a stationary slide ring which define a sealing gap between seal faces,
   a shaft sleeve arrangement including a split shaft sleeve with a first annular sleeve part and a second annular sleeve part which are connected to each other by means of a snap-in connection,
   wherein the rotating slide ring is arranged on the shaft sleeve arrangement,
   wherein the snap-in connection includes at least one snap-in nose and one snap-in recess receiving the snap-in nose to allow the first sleeve part to engage with the second sleeve part, and
   wherein the snap-in connection is a plug-and-turn connection.

2. The mechanical seal arrangement according to claim 1, wherein the snap-in connection comprises a threaded arrangement including a thread flight.

3. The mechanical seal arrangement according to claim 2, wherein the snap-in recess is arranged on the thread flight.

4. The mechanical seal arrangement according to claim 3, wherein the snap-in recess is arranged at the end of a thread flight.

5. The mechanical seal arrangement according to claim 2, wherein a dam is arranged between the thread flight and the snap-in recess.

6. The mechanical seal arrangement according to claim 2, wherein an access recess is arranged at the thread flight, which thread flight is arranged to allow the snap-in nose to be guided to the thread flight.

7. The mechanical seal arrangement according to claim 1, wherein the first sleeve part comprises a stop on an outer circumference, the rotating slide ring resting against the stop, and an elastomer seal is arranged on the second sleeve part, the rotating slide ring being arranged between the stop and the elastomer seal.

8. The mechanical seal arrangement according to claim 7, wherein the snap-in connection exerts a force on the elastomer seal in the axial direction to clamp the rotating slide ring between the elastomer seal on the second sleeve part and the stop on the first sleeve part.

9. The mechanical seal arrangement according to claim 1, wherein a material of the first sleeve part is different from a material of the second sleeve part.

10. The mechanical seal arrangement according to claim 1, wherein the snap-in connection comprises at least two snap-in noses and at least two snap-in recesses.

* * * * *